Sept. 18, 1934.　　　　F. NALLINGER　　　　1,974,033
POWER DRIVEN VEHICLE
Filed April 14, 1933
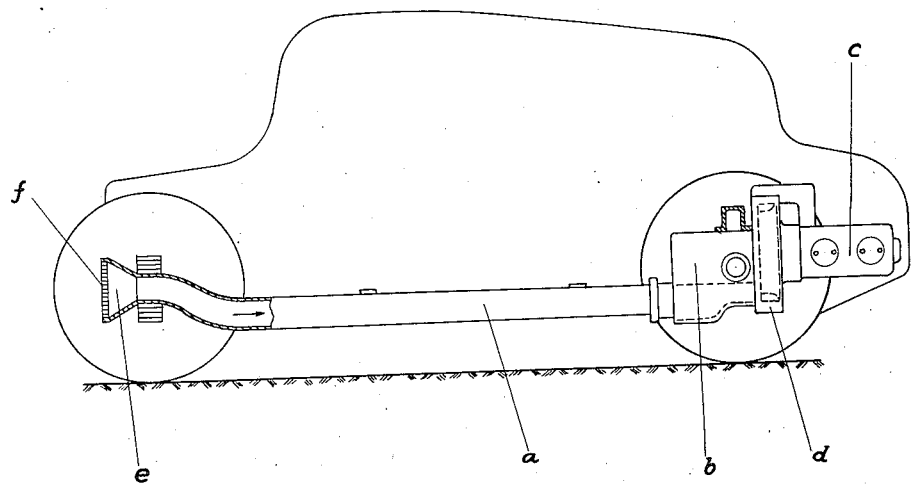
Inventor:
F. Nallinger
By: Marks & Clerk
Attys.

Patented Sept. 18, 1934

1,974,033

UNITED STATES PATENT OFFICE 1,974,033

POWER-DRIVEN VEHICLE

Fritz Nallinger, Stuttgart, Germany, assignor to Daimler-Benz Aktiengesellschaft, Stuttgart-Unterturkheim, Germany, a company of Germany Application April 14, 1933, Serial No. 666,209
In Germany April 14, 1932

4 Claims. (Cl. 180—54)

This invention relates to a power-driven vehicle having a tubular frame member which supports the vehicle body and is independent thereof and having the engine disposed at the rear, and consists substantially in this that the tubular member serves for conveying the cooling or combustion air to the engine.

In contradistinction to vehicles, in which the lower part of a self-supporting body is utilized for conveying air, the invention avoids the disadvantage that for cooling the engine special bodywork with a double wall must be provided. It becomes possible, on the contrary, for the air supply to be independent of the body, so that normal bodies may be used, without the effect of the air supply being at all reduced or the latter having to be taken into account in the design of the body. At the same time the tube is made effective use of.

Furthermore, according to the invention the engine is flanged to the tube, for instance with interposed gearing, and the fly-wheel mounted between the tube and the engine is constructed as a blower. By this means in spite of the relatively small cross-sectional area which the frame tube normally offers for the supply of air intensive cooling is obtained, which is particularly necessary in the case of air-cooled engines, and in addition a very convenient arrangement is effected.

In the accompanying drawing a constructional example of the invention is illustrated. In this drawing $a$ is the longitudinal central tube replacing the frame, at the forward end of which the transverse springs carrying the front wheels are fixed, $b$ the gearing fixed by a flange to the rear end, $c$ the engine, $d$ the fly-wheel casing. Gearing, engine and fly-wheel casing are united to form a single casing block. The front end of the tube is flared conically at $e$ and is closed by a filter $f$. The air enters the tube at the forward end, flows through it, is thereupon conveyed through the lower part of the gearing to the flywheel provided with vanes and is conveyed by the latter to the engine. The engine cylinders are suitably provided with cooling ribs and covered by means of a hood, through which the cooling air is forced.

What I claim is:

1. In a power-driven vehicle an engine disposed in the rear part of the vehicle, a longitudinal central tube replacing the frame and supporting the body, at the front end of which the cooling and combustion air can enter for being conveyed through the tube to the engine and an engine fly-wheel disposed between the longitudinal central tube and the engine, which is at the same time constructed as a blower for conveying the cooling and combustion air.

2. In a power-driven vehicle an engine and gearing unit disposed in the rear part of the vehicle for driving the rear wheels, having the gearing disposed in front of the engine, a flywheel constructed as a blower disposed between the engine and the gearing, a longitudinal central tube replacing the frame of the vehicle and supporting the body of the vehicle, at the forward end of which the cooling and combustion air which is conveyed through the tube to the engine can enter and at the rear end of which the said engine and gearing unit is flanged, the cooling and combustion air being conveyed out of the tube through the gearing casing to the fly-wheel blower.

3. In a power-driven vehicle, a longitudinal central tube replacing the frame, road wheels and suspension springs for said road wheels connected to said longitudinal central tube, a body attached to said longitudinal central tube so that the latter transmits the load of the body to the road wheels, and an engine secured to said tube at the rear end thereof and arranged to receive air for cooling or supporting combustion passed through the tube from front to rear.

4. In a power-driven vehicle, a longitudinal central tube replacing the frame, a driving unit secured to the said tube at the rear end thereof and comprising an engine and transmission gearing operatively connected to said engine, said transmission gearing being arranged forwardly of the engine and a gear casing for said transmission gearing, said casing being in open communication with the longitudinal central tube and serving for supplying air for cooling or supporting combustion passed through the tube from front to rear.

FRITZ NALLINGER.